United States Patent
Komine

(10) Patent No.: US 6,219,360 B1
(45) Date of Patent: Apr. 17, 2001

(54) HIGH AVERAGE POWER SOLID-STATE LASER SYSTEM WITH PHASE FRONT CONTROL

(75) Inventor: Hiroshi Komine, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/066,063

(22) Filed: Apr. 24, 1998

(51) Int. Cl.[7] .............................. H01S 3/10; H01S 3/13
(52) U.S. Cl. .................... 372/9; 372/26; 372/31
(58) Field of Search ................... 372/9, 26, 31

(56) References Cited

U.S. PATENT DOCUMENTS

| | | |
|---|---|---|
| 3,857,636 | 12/1974 | Angelbeck . |
| 4,005,935 | 2/1977 | Wang . |
| 4,145,671 | 3/1979 | Hellwrath . |
| 4,233,571 | 11/1980 | Wang et al. . |
| 4,321,550 | 3/1982 | Entuhov . |
| 4,399,356 | 8/1983 | Feinleib et al. . |
| 4,499,582 | 2/1985 | Karning et al. . |
| 4,500,855 | 2/1985 | Feinberg . |
| 4,618,217 * | 10/1986 | Armitage .............................. 350/355 |
| 4,673,257 | 6/1987 | Rokni et al. . |
| 4,725,138 | 2/1988 | Wirth et al. . |
| 4,734,911 | 3/1988 | Bruesselbach . |
| 4,737,621 | 4/1988 | Gonsiorowski et al. . |
| 4,769,820 | 9/1988 | Holmes . |
| 4,794,344 | 12/1988 | Johnson . |
| 4,812,639 | 3/1989 | Byren et al. . |
| 4,832,447 | 5/1989 | Javidi . |
| 4,854,677 | 8/1989 | O'Meara . |
| 4,869,579 | 9/1989 | Fischer et al. . |
| 4,921,335 | 5/1990 | Ditman, Jr. . |
| 4,996,412 | 2/1991 | Anafi et al. . |
| 5,038,359 | 8/1991 | Pepper et al. . |
| 5,040,140 | 8/1991 | Horner . |
| 5,060,225 | 10/1991 | Godfrey . |
| 5,113,282 * | 5/1992 | O'Meara et al. ................... 359/241 |
| 5,164,578 | 11/1992 | Witthoft et al. . |
| 5,208,696 | 5/1993 | Kobayashi et al. . |
| 5,349,432 | 9/1994 | Elerath . |
| 5,396,364 | 3/1995 | O'Meara et al. . |
| 5,535,049 | 7/1996 | Bowers et al. . |
| 5,592,503 | 1/1997 | Welch et al. . |
| 5,629,765 | 5/1997 | Schumutz . |
| 5,651,018 | 7/1997 | Mehuys et al. . |
| 5,654,741 | 8/1997 | Sampsell et al. . |
| 5,694,408 * | 12/1997 | Bott et al. ................................ 372/6 |

* cited by examiner

Primary Examiner—Frank G. Font
Assistant Examiner—Armando Rodriguez
(74) Attorney, Agent, or Firm—Michael S. Yatsko

(57) ABSTRACT

A scalable high power laser system includes a plurality of parallel connected modular power amplifier arms, coupled to a common master oscillator to provide a high average power laser system with a scalable output power level, particularly suitable for laser weapon systems with varying power level output applications. Adaptive optics devices are provided in order to provide pre-compensation of phase front distortions due to the modular amplifier arms as well as encode the wave front of the laser beam with a phase conjugate of atmospheric aberrations.

3 Claims, 4 Drawing Sheets

HIGH AVERAGE POWER SOLID-STATE LASER SYSTEM WITH PHASE FRONT CONTROL

BACKGROUND OF THE INVENTION

1. Field of the Invention

The present invention relates to a high average power laser system and more particularly to a modular high average power laser system which includes a phased array of parallel power amplifiers, connected to a common master oscillator for synthesizing composite beams of varying power levels, and adaptive optics which include spatial light modulators for encoding the wave front of the laser beam with a conjugate phase to compensate for atmospheric aberrations.

2. Description of the Prior Art

High power laser weapon systems are generally known in the art. An example of such a high power laser system is disclosed in U.S. Pat. No. 5,198,607, assigned to the same assignee as the assignee of the present invention and hereby incorporated by reference. Such laser weapon systems normally include a tracking system for locking the high power laser on a target, such as a ballistic missile, cruise missile, bomber or the like. Such laser weapons are used to destroy or "kill" such targets. The effectiveness of such a laser weapon system depends on many factors including the power of the laser at the target. Many factors are known to affect the power of the laser at the target. One such factor is known as thermal blooming, discussed in detail in U.S. Pat. No. 5,198,607. In order to compensate for thermal blooming, it is known to use multiple high power lasers for killing a single target, for example as disclosed in U.S. patent application Ser. No. 08/729,108, filed on Oct. 11, 1996 for a LASER ALONG BODY TRACKER (SABOT) by Peter M. Livingston, assigned to the same assignee as the assignee of the present invention.

Other factors are known to affect the power level of the laser at the target including atmospheric aberrations which cause distortion of the wave front of the high power laser beam. In order to correct the wave front of the laser beam due, for example, to atmospheric aberrations, various adaptive optics systems have been developed. Examples of such systems are disclosed in U.S. Pat. Nos. 4,005,935; 4,145,671; 4,233,571; 4,399,356; 4,500,855; 4,673,257; 4,725,138; 4,734,911; 4,737,621; 4,794,344; 4,812,639; 4,854,677; 4,921,335; 4,996,412; 5,164,578; 5,349,432; 5,396,364; 5,535,049; and 5,629,765, all hereby incorporated by reference.

Various laser wave front compensation techniques have been employed. For example, U.S. Pat. Nos. 4,005,935; 4,794,344; and 5,535,049 utilize Brilloin scattering techniques to generate a phase conjugate of the laser wave front in order to compensate for distortions. Other techniques include the use of spatial light modulators which divide the laser beam into a plurality of subapertures, which, in turn, are directed to an array of detectors for detecting the phase front distortion which, in turn is used to compensate the phase fronts as a function of the distortion. Examples of systems utilizing spatial light modulators are disclosed in U.S. Pat. Nos. 4,399,356; 4,854,677; 4,725,138; 4,737,621; and 5,164,578, all hereby incorporated by reference.

There are several disadvantages of the systems mentioned above. One disadvantage relates to the fact that such laser systems have a fixed architecture for a given laser power output level. As such, such laser systems are generally not scalable. Unfortunately, various laser applications require different power levels. For example, laser weapon applications require different output power levels depending on the type and distance of the intended targets. In such laser weapon applications, separate laser systems are required for each application which increases the cost of the laser weapon system as well as the number of spare parts required for maintenance.

Another disadvantage of such known laser systems with phase front compensation is that such systems are limited to the power level ability of the various components forming the system. For example, such laser weapon systems are known to use lasers, normally high average power chemical lasers which have power levels of a few kilowatts. Due to such high power requirements, spatial light modulators have heretofore been unsuitable for such applications. As such, alternate techniques have been developed providing wave front compensation of such high average power lasers. For example, U.S. Pat. No. 4,321,550 relates to a high average power laser system with phase conjugate correction. In this system, the phase front correction is based on Brilloin scattering. U.S. Pat. No. 3,857,356 discloses another system which utilizes a diffraction grating to provide a reduced power level with test beam. The system disclosed in '636 Patent also includes an interferometer with a phase shifting device disposed in one leg to provide phase front compensation high average power laser systems.

Although such systems are suitable for providing phase front compensation of high average power laser systems, such systems are relatively bulky and inefficient. In many applications, there is a desire to use laser weapons that are more efficient and compact, particularly for laser weapon systems.

SUMMARY OF THE INVENTION

It is an object of the present invention to solve various problems in the prior art.

It is yet another object of the present invention to provide a wave front compensation system for compensating phase distortions of a relatively high average power level laser systems.

It is yet a further object of the present invention to provide a laser system with phase front compensation which is relatively compact and efficient.

It is yet a further object of the present invention to provide a laser power system with wave front compensation which provides a scalable output power level to enable the architecture of laser system to be used in various laser applications of various power levels.

Briefly, the present invention relates to a scalable high power laser system which includes a plurality of power amplifiers coupled to a common maser oscillator to provide a laser system with a scalable output power level, particularly suitable for laser weapon systems with varying power level output applications. Adaptive optics are provided in order to compensate for phase front distortions. The adaptive optics is disposed on the input of the power amplifiers to provide pre-compensation of phase front distortions due to the power amplifier modules. The adaptive optics also include a spatial light modulator for encoding the wave front with a conjugate phase for compensating for wave front distortions due to atmospheric aberrations.

DESCRIPTION OF THE DRAWINGS

These and other objects of the present invention will be readily understood with reference to the following specification and attached drawings wherein.

DETAILED DESCRIPTION

The present invention relates to a relatively high average power laser system with wave front compensation. The system in accordance with the present invention is suitable for use in relatively high average power applications making the system suitable for use with laser weapon systems. An important aspect of the invention is that the system is formed with a scalable architecture which includes a plurality of parallel power amplifier which enable the output power level to be scaled for different power level applications. As mentioned above, various laser applications, such as laser weapon applications require different power output levels depending upon the type as well as the distance of the intended targets. The scalable architecture of the laser system in accordance with the present invention is particularly suitable for laser weapon systems and is also compatible with the power level capability of known spatial light modulators for compensation for wave front distortions of the laser beam resulting from atmospheric aberrations.

Figure 1:
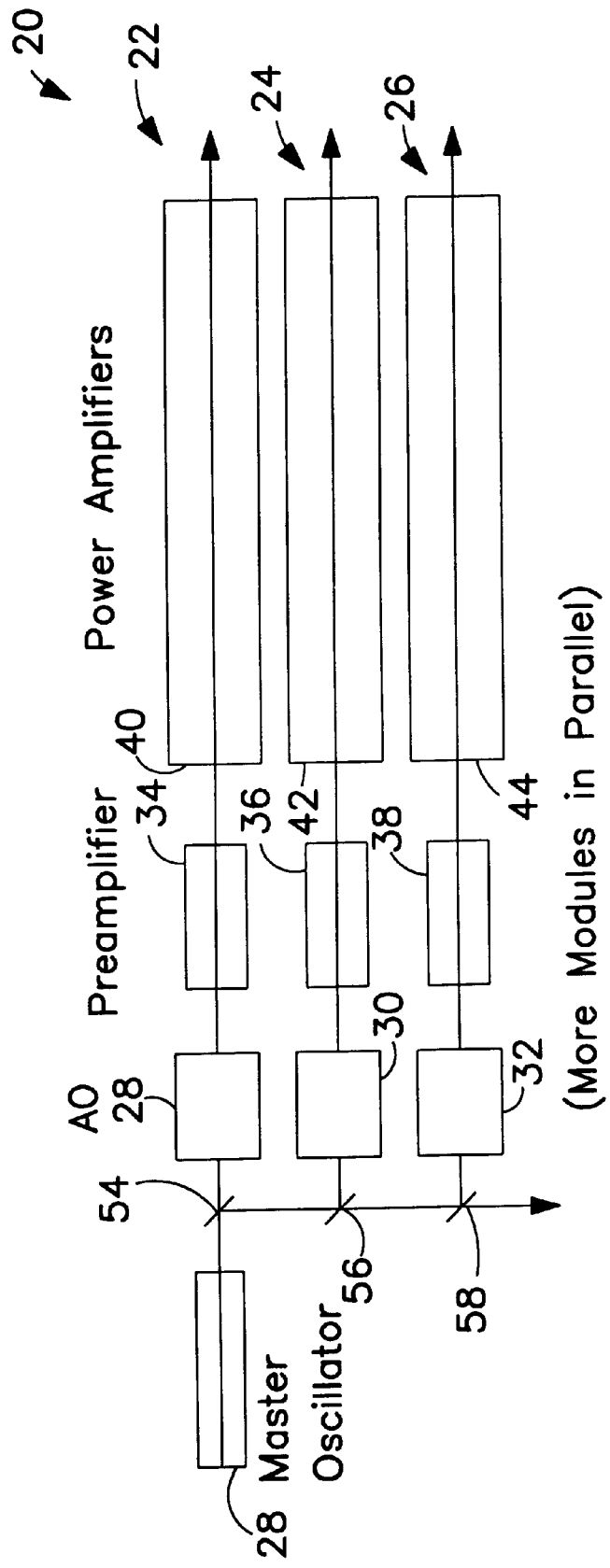
FIG. 1 is a generalized block diagram of a laser system in accordance with the present invention with a scalable power output.
Figure 4:
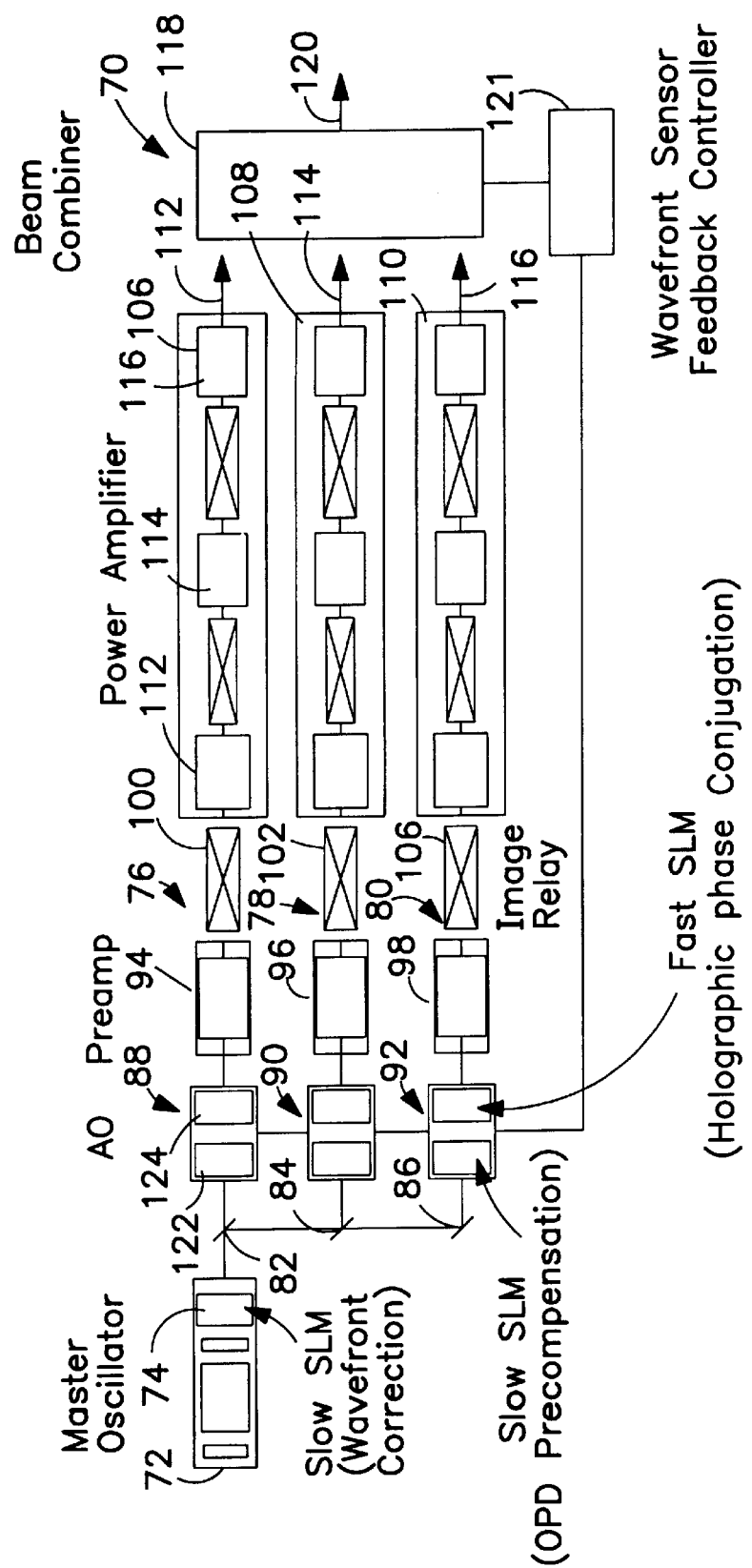
FIG. 4 is a block diagram of a laser system with a scalable power output level which includes phase front compensation for the distortion caused by the power amplifier as well as the atmospheric aberrations in accordance with the present invention.

The modular laser system with a scalable power output level with wave front compensation is illustrated in FIGS. 1 and 4 and generally identified with the reference numeral 20. As mentioned above, an important aspect of the invention relates to the fact that the modular laser system 20 is able to provide for wave front compensation of a relatively high average power laser system, suitable for use in high energy laser weapon systems. Referring to FIG. 1, the modular laser system 20 includes a plurality of modular amplifier arms 22, 24 and 26, connected a common master oscillator 28 forming a scalable high average power solid state laser system with wave front compensation in accordance with the present invention. The modular laser system 20 enables the power output level to be scaled while taking advantage of adaptive optic devices, as will be discussed in more detail below, which have relatively limited power level capabilities. More particularly, each modular amplifier arm 22, 24 and 26 includes an adaptive optics device 28, 30, 32, a pre-amplifier 34, 36 and 38 as well as a power amplifier 40, 42 and 44, all serially coupled. The power output of the modular laser system is scaled by the number of parallel modular amplifier arms 22, 24 and 26 connected to the master oscillator 28. Although three modular amplifier arms 22, 24 and 26 are shown in FIGS. 1 and 4, additional modular amplifier arms can be added, limited by the power capability of the master oscillator 28.

Figure 2:
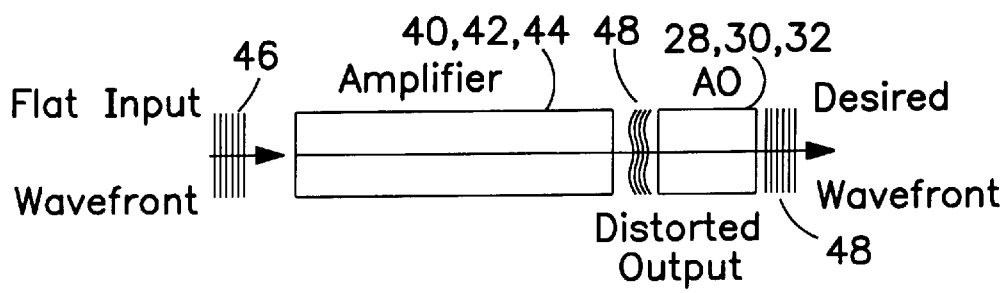
FIG. 2 is a block diagram of a portion of the system illustrated in FIG. 1 but with the adaptive optics disposed downstream of the power amplifiers.
Figure 3:
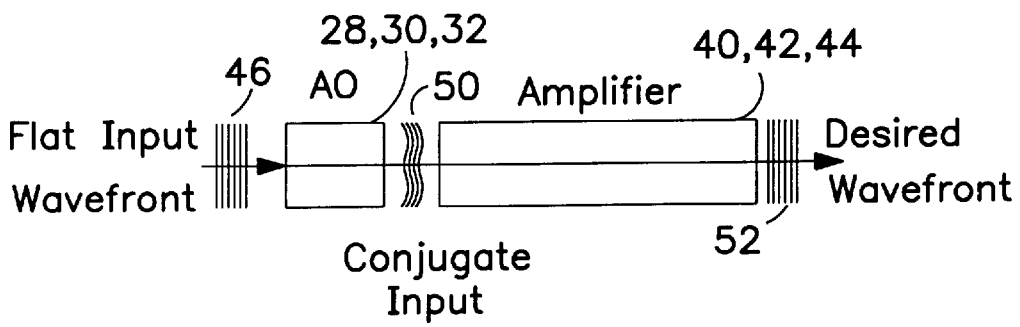
FIG. 3 is similar to FIG. 2 but shown with the adaptive optics disposed upstream of the power amplifiers.

As illustrated in FIGS. 2 and 3, the placement of the adaptive optics devices 28, 30 and 32 in the modular amplifier arms 22, 24, and 26 allows the system to take advantage of known adaptive optics devices which includes spatial light modulators whose power capability is limited to a few kilowatts. FIGS. 2 and 3 illustrate the differences in disposing the adaptive optics modules 28, 30 and 32 downstream and upstream of the power amplifiers 22, 24 and 26. Both systems illustrated in FIGS. 2 and 3 provide wave front compensation. More particularly, referring to FIG. 2 first, in response to a flat input wave front 46, the output wave front 48 is distorted by the amplifier modules 40, 42 and 44. The distorted output wave front 48 from the amplifier modules 40, 42 and 44 is corrected by the adaptive optics devices 28, 30 and 32 to provide a relatively flat output wave front 49. However, disposing the adaptive optics devices 28, 30 and 32 downstream of the power amplifiers 40, 42 and 44 as shown in FIG. 2 results in full power loading on the adaptive optics 28, 30 and 32. Unfortunately, with a topology as illustrated in FIG. 2, the power capabilities of various adaptive optics devices including spatial light modulators are exceeded for relatively high average power laser systems. For example, for a system 20 as illustrated in FIG. 1 with a 12 kilowatt output, each modular amplifier arm 22, 24 and 26 would be subjected to 4 kilowatts which exceeds the power capability of many known spatial light modulators. As discussed above, the power capability of known spatial light modulators is just a few kilowatts. Thus, the topology illustrated in FIG. 2 would be unsuitable for spatial light modulators.

The topology illustrated in FIG. 3 allows the modular laser system 20 to take advantage of known spatial light modulators for wave front compensation. In particular, in the embodiment illustrated in FIG. 3, the adaptive optics devices 28, 30 and 32 are disposed upstream of the power amplifiers 40, 42 and 44. With such a topology, in response to a flat input waveform 46, the adaptive optics devices 28, 30 and 32 provide a phase conjugate wave front 50, which, in turn, is applied to the power amplifiers 40, 42 and 44. The output of the power amplifiers 40, 42 and 44 is a flat wave front 52. In the topology illustrated in FIG. 3, using the above example and assuming a 3 kilowatt gain for each power amplifier 40, 42 and 44, the adaptive optics devices 28, 30 and 32 are subject to a power level of only 1 kilowatt, well within the 2 kilowatt range of known spatial light modulators.

Referring back to FIG. 1, the master oscillator 28 provides pulses of radiation or light into the modular amplifier arms 22, 24 and 26. The master oscillator 28 may be a conventional laser, such as a gas laser, dye laser or a solid state laser. The master oscillator 28 is coupled to the modular amplifier arms 22, 24 and 26 by way of a plurality of beam splitters 54, 56, 58. The beam splitters 54, 56 and 58 are conventional and are used to direct a portion of the light beams from the master oscillator 28 to each of the modular amplifier arms 22, 24 and 26. For an exemplary 12 kilowatt output laser system as discussed above, the master oscillator 28 is selected to have about 3 kilowatt output power.

The distributed light pulses from the beam splitters 54, 56 and 58 are applied to the adaptive optics devices 28, 30 and 32 which, as will be discussed in more detail below, compensate for optical parameter distortions of the wave front distortions of the output laser beam at the target resulting from atmospheric aberrations. The pre-amplifiers 34, 36 and 38 amplify the distributed light beam pulse from the master oscillator 28 which, in turn, is further amplified by the power amplifiers 40, 42 and 44. The power amplifiers 40, 42 and 44 are used to provide coherent output beams which, as will be discussed in more detail below, can be combined by a beam combiner to provide a scalable high average power level output light beam.

The adaptive optics 28, 30 and 32 are discussed in more detail below. An exemplary pre-amplifier 34, 36 and 38 may be a low-power (1 KW level) amplifier module consisting of a gain medium, such as Nd:YAG slab, and optical pumping means, such as an array of diode lasers. In the example discussed above, the pre-amplifiers 34, 36 and 38 are selected to have a gain of approximately 20. Each power amplifier 40, 42 and 44 may be selected to consist of three 1 KW module gain sections and provide 3 kilowatts of amplification. Suitable power amplifiers 40, 42 and 44 are diode-pumped high-power Nd:YAG slab lasers.

An exemplary high average power solid state laser system 70 is illustrated in FIG. 4. The system 70 illustrated in FIG. 4 includes a master oscillator 72, for example, a solid state laser, which includes its own adaptive optics device 74 for providing a relatively flat output wave front. The adaptive optics device 74 for the master oscillator 72 may be a slow spatial light modulator for compensating for wave front phase distortion resulting from the master oscillator 72. An exemplary master oscillator 72 consists of a Nd:YAG laser with nearly diffraction-limited beam quality. An exemplary adaptive optics device 74 is a liquid-crystal phase modulator array with electronic means to adjust the phase profile. Such a master oscillator and adaptive optics are known in the art.

The master oscillator 72 provides a pulsed light beam that is distributed among a plurality of parallel connected modular amplifier arms 76, 78 and 80 by way of a plurality of beam splitters 82, 84 and 86. The distributed pulsed light beams are applied to adaptive optic devices 88, 90 and 92 which, will be discussed in more detail below compensate for optical path distortions resulting from the power amplifiers as well as distortions of the laser wave front due to atmospheric aberrations to provide a coherent light beam with a relatively flat phase front. The outputs of the adaptive output devices 88, 90 and 92 are applied to pre-amplifiers 94, 96 and 98, for amplifying the distributed light pulse on the master oscillator 72. The output of the pre-amplifiers 94, 96 are applied to image relays 100, 102 and 104. The image relays 100, 102 and 104 maintain the near field beam profile from one gain module to the next in order to optimize power extraction and to prevent potential damage due to beam spillage caused by diffraction. Such image relays are known in the art. An aperture placed within each relay 100, 102, and 104 also blocks unwanted light from passing through the gain sections that would otherwise create parasitic oscillations. The outputs of the image relays 100, 102, and 104 are applied to a plurality of power amplifiers 106, 108 and 110 which, as shown, are provided with 3 gain sections 112, 114 and 116. The power amplifiers 106, 108 and 110 provide coherent amplified output beams 112, 114 and 116 which, may be combined by a beam combiner 118 to provide a high average power output beam 120. As discussed above, the power level of the output beam 120 is scalable by the number of modular amplifier arms 76, 78 and 80 included in the system 70.

The wave front of the output beam 120 is detected by a wave front sensor 121 which forms a feedback controller in a closed loop with the adaptive optics devices 88, 90 and 92 to provide holographic phase conjugation; encode the wave front with a phase conjugate wave which compensates for distortions of the phase front due to atmospheric aberrations. Each adaptive optic device 88, 90 and 92 may include a slow spatial light modulator 22 and a relatively fast spatial light modulator 124. The slow spatial light modulator 122 provides pre-compensation of relatively slow wave distortions of the light beams due to the power amplifiers 106, 108 and 110. The fast spatial light modulators 124 are serially coupled to the slow spatial light modulators 122 to provide for conjugate wave encoding of the wave front to compensate for distortions due to atmospheric aberrations. Each of the fast spatial light modulators 124 may consist of an array of individually addressable pixels. These pixels under the control of the wave front sensor 122 are modulated as a function of wave front of the output beam 120 to create a conjugate phase front.

Figure 5:
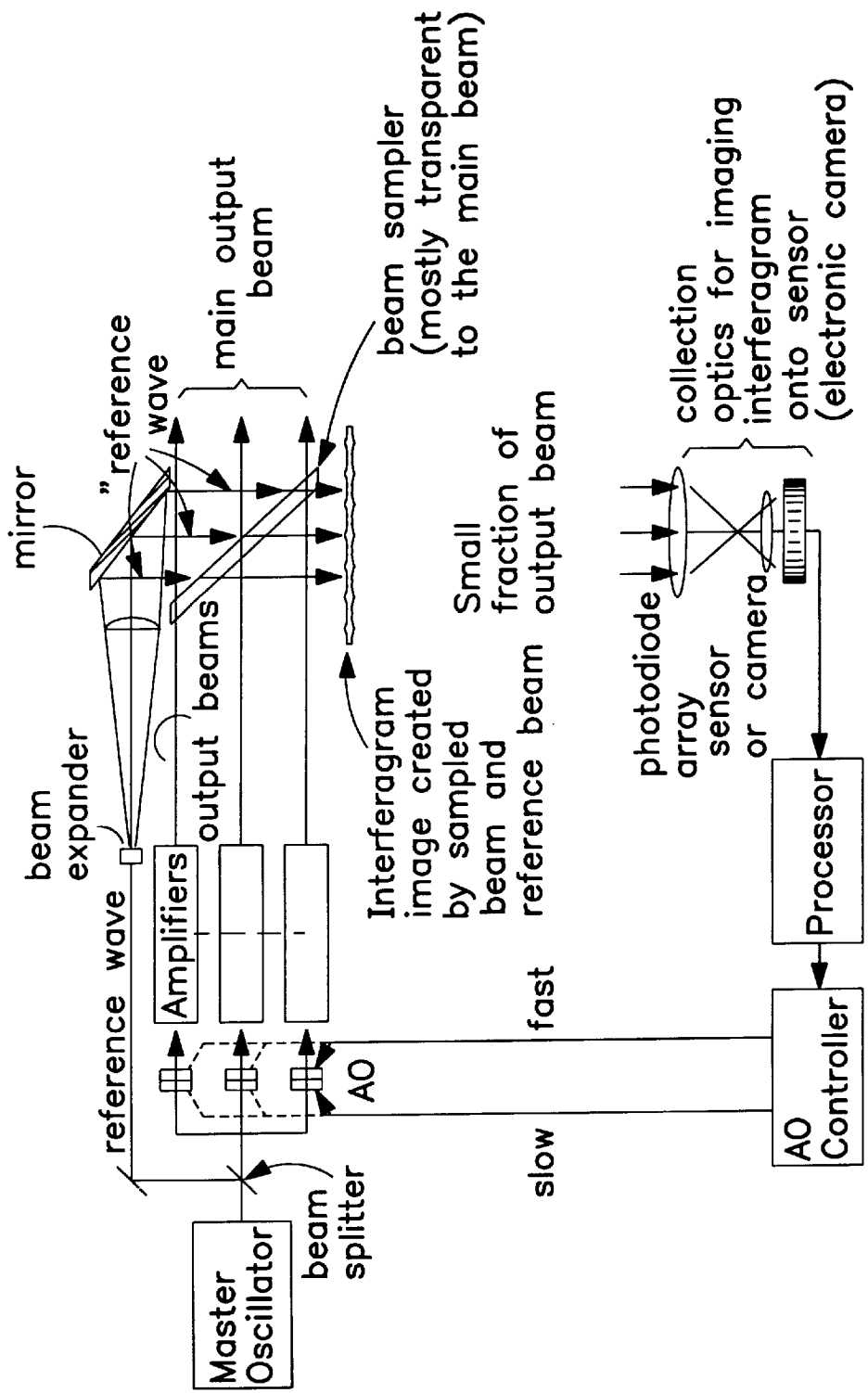
FIG. 5 is a block diagram of an exemplary wave front sensor in accordance with the present invention.

An exemplary wavefront sensor consists of a Mach-Zehnder interferometer in which a small portion of the master oscillator output provides a reference wave to form an interferogram image of the amplifier output beams by sampling a small fraction of the output beam, as illustrated on FIG. 5. The interferogram image converts the phase errors into intensity variations that can be observed and recorded by an electronic photodiode array or CCD camera and an electronic image capture device (e.g., computer with frame-grabber and processing software). The resulting information on the magnitude of the phase error as represented by image brightness at each position of the sampled beam contains the wavefront data. The adaptive optics (AO) controller uses this data to generate the conjugate of the wavefront for each pixel of the AO in each amplifier path.

The AO element consists of a slow and fast parts, driven separately by the AO controller. The slow AO may consist of liquid-crystal (LC) spatial light modulator (SLM) that has an array of phase shifters with relatively large dynamic range (several waves) but with slow response (seconds). The fast AO may also be built using a LC-SLM array that is optimized for smaller range (up to one wave) but much faster response (less than millisecond). The slow and fast components of the wavefront data are separated in the processor to drive respective parts of the AO controller.

The system 70 illustrated in FIG. 4 may be used to form a high average power solid state laser with wave front compensation. In addition to being compact and efficient, the high average power level solid state laser provides a scalable power output useful in applications where the power level requirements vary. In order to increase the kill level of solid state lasers used for laser weapons, the system provides adaptive optics for compensating for optical component distortions as well as encoding the phase front with a phase conjugate wave in order to compensate for atmospheric aberrations.

Obviously, many modifications and variations of the present invention are possible in light of the above teachings. Thus, it is to be understood that, within the scope of the appended claims, the invention may be practiced otherwise than as specificlly described above.

I claim:

1. A high average power laser system with a scalable output power level, the laser system comprising:

a master oscillator for generating pulsed light beams;

one or more modular amplifier arms for providing an output light beam, each modular amplifier arm optically coupled to said master oscillator and including a power amplifier for amplifying said pulsed light beam distributed from said master oscillator and defining an output light beam;

one or more first adaptive optics devices for encoding the wave front for said output beam with a phase conjugate to compensate for wave front distortions of said output beam due to atmospheric aberrations, said first adaptive optics devices disposed in one or more of said modular amplifier arms and including a first spatial light modulator, said first spatial light modulator being a relatively fast spatial light modulator for providing holographic phase conjugation;

a second adaptive optics device, serially coupled to said first adaptive optics device; and a beam combiner for combining the output beams for said modular amplifier arms and providing a scalable composite output beam whose power level is a function of the number of modular amplifier arms connected to the system, said system being configured such that the output level of said scalable composite output beams exceeds the power capability of each of said modular amplifier arms.

2. The laser system as recited in claim 1, wherein said second adaptive optics device includes a second spatial light modular.

3. The laser system as recited in claim 2, wherein said second spatial light modular is a slow spatial light modular for compensating for wavefront distortions due to said modular amplifier arms.

* * * * *